United States Patent [19]
Kleinecke et al.

[11] Patent Number: 5,481,075
[45] Date of Patent: Jan. 2, 1996

[54] COMPACT MOTOR CONTROLLER WITH AN IMPROVED ARRANGEMENT FOR DISCONNECTING AND WITHDRAWING A DRAWOUT UNIT

[75] Inventors: John D. Kleinecke; George A. Houche, both of Houston, Tex.

[73] Assignee: Toshiba International Corporation, Calif.

[21] Appl. No.: 208,709

[22] Filed: Mar. 11, 1994

[51] Int. Cl.⁶ .............................. H01H 9/20; H02B 11/12
[52] U.S. Cl. ........................................ 200/50 AA; 361/608
[58] Field of Search ........................... 200/50 AA, 330; 361/601–626, 648, 725, 829

[56] References Cited

U.S. PATENT DOCUMENTS

| | | | |
|---|---|---|---|
| 2,885,502 | 5/1959 | Eichelberger et al. | 200/50 AA |
| 3,188,412 | 6/1965 | Netzel | 200/50 AA |
| 3,188,415 | 6/1965 | Netzel | 200/50 AA |
| 3,264,433 | 8/1966 | Clark, Jr. et al. | 337/7 |
| 3,678,237 | 7/1972 | Rickert et al. | 200/166 E |
| 4,002,865 | 1/1977 | Kuhn et al. | 200/50 AA |
| 4,086,452 | 4/1978 | Collins | 200/50 AA |
| 4,317,160 | 2/1982 | Tillson et al. | 200/50 AA X |
| 4,412,112 | 10/1983 | Ishikawa et al. | 200/50 AA |
| 4,427,854 | 1/1984 | Kleinecke et al. | 200/330 |
| 4,447,858 | 5/1984 | Farag et al. | 361/829 |
| 4,448,450 | 5/1984 | Kleinecke et al. | 292/210 |
| 4,454,564 | 6/1984 | Little et al. | 361/606 |
| 4,463,408 | 7/1984 | Kleinecke et al. | 361/614 |
| 4,477,701 | 10/1984 | Castonguay et al. | 200/50 AA |
| 4,482,892 | 11/1984 | Farag et al. | 340/654 |
| 4,482,936 | 11/1984 | Saito | 200/50 AA X |
| 4,621,303 | 11/1986 | Rowe | 200/50 AA X |
| 4,652,966 | 3/1987 | Farag et al. | 361/189 |
| 4,739,672 | 4/1988 | Kleinecke et al. | 74/483 R |
| 4,839,477 | 6/1989 | Orosz et al. | 200/50 AA |

OTHER PUBLICATIONS

"Bolted Contact Switches", Catalog, The Pringle Electrical Manufacturing Company, pp. 1–7 (1984).

*Primary Examiner*—J. R. Scott
*Attorney, Agent, or Firm*—Foley & Lardner

[57] ABSTRACT

A motor controller includes an isolation switch having a main power supply terminal and a first bolted pressure contact and a load receptacle having a second bolted pressure contact. The motor controller also includes a drawout unit having a line terminal and a load terminal, the line terminal for engaging the first bolted pressure contact when the drawout unit is in an inserted position and the load terminal for engaging the second bolted pressure contact when the drawout unit is in the inserted position. The drawout unit rests on a drawer which is in turn supported by a pair of sliding rails. A current transformer generates a sensing signal for monitoring purposes. The components are arranged in a compact design which requires significantly less space than conventional designs.

30 Claims, 9 Drawing Sheets

COMPACT MOTOR CONTROLLER WITH AN IMPROVED ARRANGEMENT FOR DISCONNECTING AND WITHDRAWING A DRAWOUT UNIT

BACKGROUND OF THE INVENTION

The invention relates to motor controllers. More specifically, the invention relates to a compact motor controller design which has improved drawout capabilities.

Motor controllers are used to control electrical equipment such as motors and transformers. Typically, a motor controller provides some form of short circuit protection such as a circuit breaker or a fuse, a way to connect and disconnect power to the load such as a vacuum contactor or an airbreak, and overload protection such as an overload relay. The motor controller also provides some way to disconnect the motor controller from the main power supply for maintenance on the motor controller. This typical arrangement may be varied to suit a particular application.

Conventional motor controllers and motor controller features are illustrated and described in U.S. Pat. No. 4,739,672, entitled "Mechanical Interlock for a Vacuum Contactor" and issued to John D. Kleinecke et al. on Apr. 26, 1988; U.S. Pat. No. 4,448,450, entitled "Defeatable Handle and Interlock for Electrical Equipment Enclosure" and issued to John D. Kleinecke et al. on May 15, 1984; U.S. Pat. No. 4,427,854, entitled "Racking Mechanism for Motor Control Center" and issued to John D. Kleinecke et al. on Jan. 24, 1984; U.S. Pat. No. 4,463,408, entitled "Two-High Motor Control Center with Staggered Cubicles" and issued to John D. Kleinecke et al. on Jul. 31, 1984; U.S. Pat. No. 4,482,892, entitled "Caution Lamp for High Voltage Controller" and issued to Samir F. Farag et al. on Nov. 13, 1984; U.S. Pat. No. 4,652,966, entitled "Solenoid-Actuated Mechanical Interlock for a Motor Controller" and issued to Samir F. Farag et al. on Mar. 24, 1987; U.S. Pat. No. 4,454,564, entitled "Fabricated Carriage Assembly for High Voltage Contactor" and issued to Thomas R. Little et al. on Jun. 12, 1984; and U.S. Pat. No. 4,447,858, entitled "Rigid Subchassis Structure for Motor Control Center or the Like" and issued to Samir F. Farag et al. on May 8, 1984. The entire contents of these patents are incorporated herein by reference.

Conventional motor controllers may include a drawout unit which can be withdrawn from the motor controller housing to access certain components. Access to the vacuum contactor, power fuses, and other equipment is required during initial installation and for periodic maintenance. In some conventional designs withdrawal of the drawout unit is used for power isolation. Such conventional drawout units are provided with a set of wheels which roll on a track in the motor controller compartment. The wheels and associated track facilitate movement of the drawout unit and also serve to guide the drawout unit into proper alignment with the fixed portion of the motor controller. The electrical power source is isolated by disconnecting spring-loaded finger assemblies called "stabs." The stabs rely on springs to maintain contact pressure between fixed and moveable parts.

Motor controllers are commonly stacked in a single enclosure, for example, "two-high." In a two-high arrangement the motor controller compartment height for each controller must be 45 inches or less, in order to maintain the standard maximum overall enclosure height of 90 inches.

Figure 1:
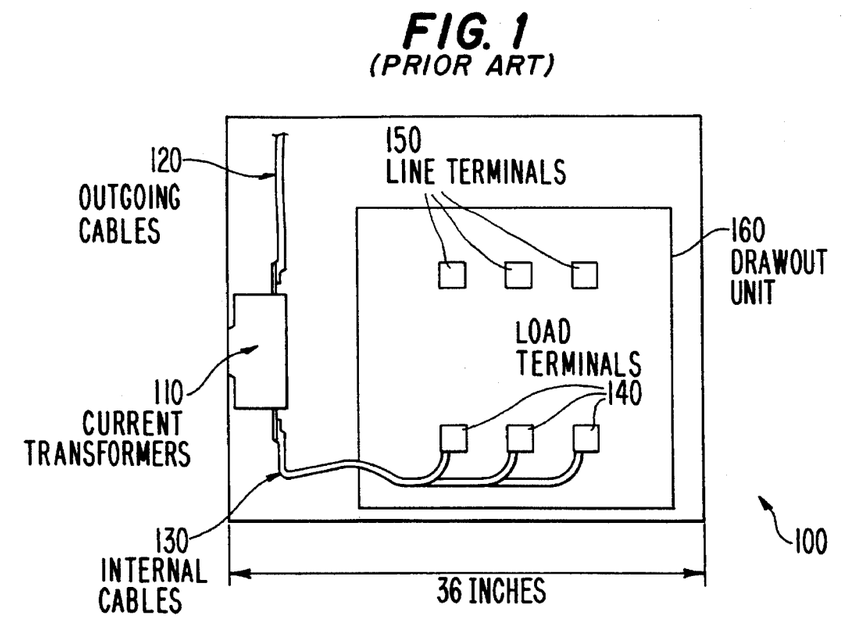
FIG. 1 is a front view of a conventional medium voltage motor controller.

FIG. 1 illustrates the arrangement of a conventional motor controller design. FIG. 1 illustrates a front view of a medium voltage (MV) motor controller 100. Due to height restrictions, in this conventional design current transformers 110 and outgoing cables 120 are located to the left side of the other major components. (In FIG. 1, the second and third sets of current transformers and outgoing cables are obscured by the first set.) Internal cables 130 connect the current transformers 110 to load terminals 140 of the vacuum contactor.

In this conventional arrangement, the narrowest motor controller enclosure width obtainable is 36 inches due to the size of the major components and their traditional arrangement.

SUMMARY OF THE INVENTION

An object of this invention is to provide an improved motor controller.

Another object of this invention is to provide an improved arrangement for disconnecting and withdrawing a drawout unit.

A further object of this invention is to provide a more compact motor controller.

This invention provides a motor controller which includes an isolation switch having a main power supply terminal and a first bolted pressure contact and a load receptacle having a second bolted pressure contact. The motor controller also includes a drawout unit having a line terminal and a load terminal, the line terminal for engaging the first bolted pressure contact when the drawout unit is in the inserted position and the load terminal for engaging the second bolted pressure contact when the drawout unit is in the inserted position. The drawout unit rests on a drawer which is in turn supported by a pair of sliding rails. A current transformer generates a sensing signal for monitoring purposes. The components are arranged in a compact design which requires significantly less space than conventional designs.

Other objects, features, and advantages of the invention will be apparent from the following description of various embodiments of the invention.

BRIEF DESCRIPTION OF THE DRAWINGS

Various embodiments of the invention will be described in detail below with reference to the accompanying drawings, wherein.

DETAILED DESCRIPTION OF PREFERRED EMBODIMENTS

Figure 2:
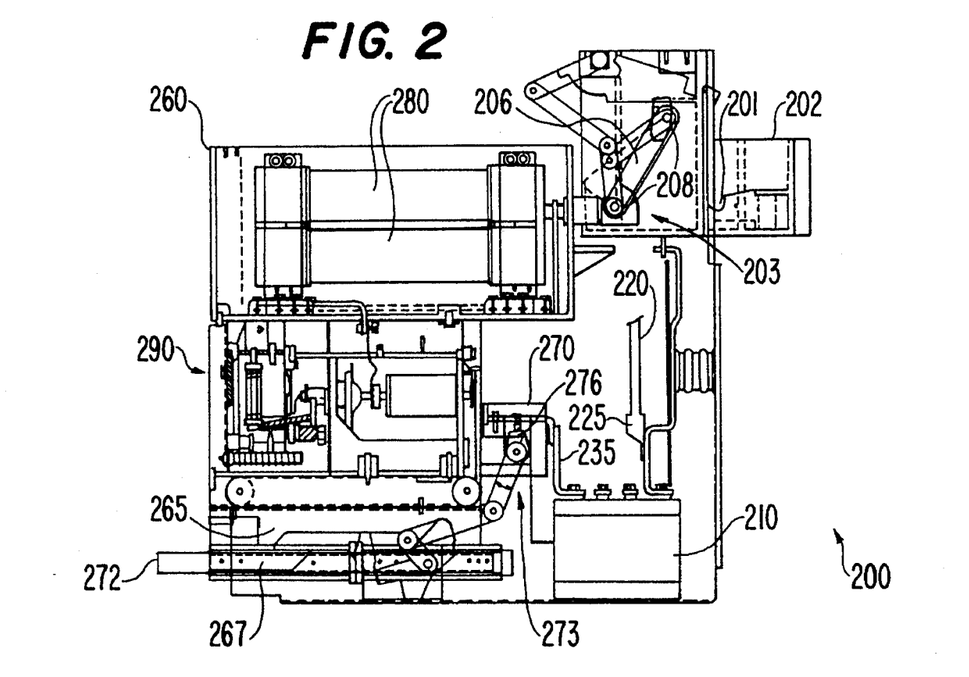
FIG. 2 is a side view of a motor controller according to one embodiment of the invention with its isolation switch open and its load receptacle open.
Figure 3:
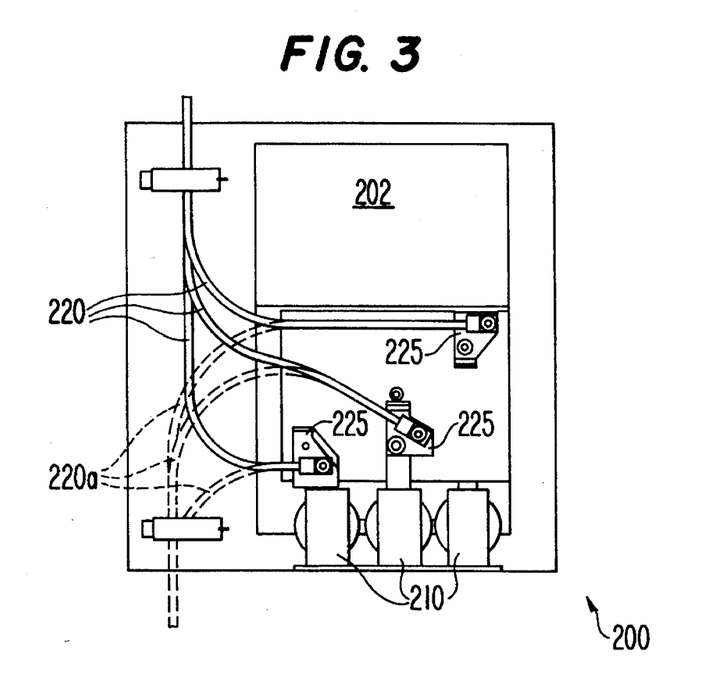
FIG. 3 is a front view of the motor controller of FIG. 2.

FIGS. 2 and 3 illustrate side and front views of a motor controller 200 according to one embodiment of the invention. Motor controller 200 is a medium voltage (i.e., 2300 to 7200 volts) motor controller which can control motors in the 50 to 5000 horsepower range. Motor controller 200 is used to start and stop a motor and also provides short circuit and overload protection. The motor controller is 30 inches wide and 36 inches deep. The height depends on, for example, whether a one-high or two-high arrangement is employed.

Motor controller 200 includes an isolation switch 202, a drawout unit 260, a load receptacle 270, current transformers 210, and terminals 225 for connecting outgoing cables, or field wiring. In FIG. 2 the motor controller 200 has its isolation switch open and its load receptacle open. In FIG. 3 the drawout unit has been removed for clarity. The outgoing cables can enter from the top as shown in FIG. 3 by solid lines 220 or can enter from the bottom as shown in FIG. 3 by dotted lines 220a.

The isolation switch 202 is used to isolate the motor controller 200 from the main power supply (not shown) during maintenance on the motor controller. Three-phase main power is fed to the controller via main power supply terminals 201. (In FIG. 2, the second and third main power supply terminals are obscured by the first main power supply terminal.) The isolation switch is closed during normal, i.e., non-maintenance, operations.

Drawout unit 260 includes insulated power fuses 280 and medium voltage vacuum contactor 290. Two power fuses are provided in parallel for each of the three phases. (In FIG. 2, the second and third sets of power fuses are obscured by the first set.) The power fuses provide short-circuit protection and the vacuum contactor serves to turn the motor on and off. In the vacuum contactor electrical connection and disconnection is made within a vacuum chamber to minimize arc generation.

Isolation switch 202 includes a first set of bolted pressure contacts 203 and load receptacle 270 includes a second set of bolted pressure contacts 273. These bolted pressure contacts rely on bolting pressure rather than spring pressure to achieve a low electrical contact resistance between moveable members and terminals. The first and second sets of bolted pressure contacts are opened to permit withdrawal of the drawout unit 260, as will be described in further detail below.

In operation, three-phase power is fed from the main power supply to isolation switch 202, and from isolation switch 202 to the power fuses 280 via the first set of bolted pressure contacts 203. The power fuses are connected internally to the vacuum contactor 290 on the drawout unit 260. The vacuum contactor 290 feeds power to the load receptacle 270 via the second set of bolted pressure contacts 273, which in turn feed primary windings of current transformers 210 via bus links 235. The current transformers generate a relatively small sensing signal for monitoring purposes in their secondary windings that is proportional to the current in the primary windings that is being supplied to the motor. These sensing signals can be used, for example, for overload protection. The primary windings of the current transformers 210 feed terminals 225, to which outgoing cables 220 are attached.

FIGS. 4 to 14 will be used to illustrate and describe the improved drawout unit disconnecting and connecting arrangement of motor controller 200. The design of the drawout unit disconnecting and connecting arrangement is an important aspect of this invention.

Figure 4A:
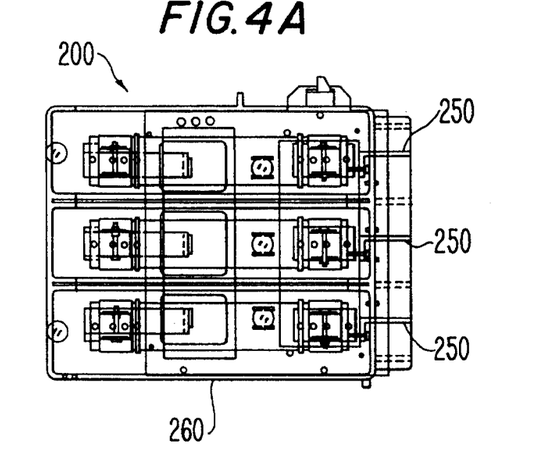
FIGS. 4A and 4B are top views of portions of the motor controller of FIG. 2.
Figure 4B:
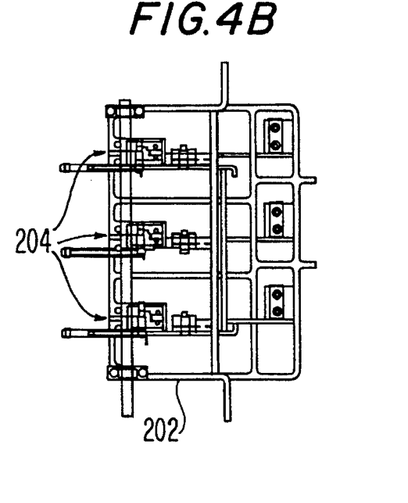
Figure 5:
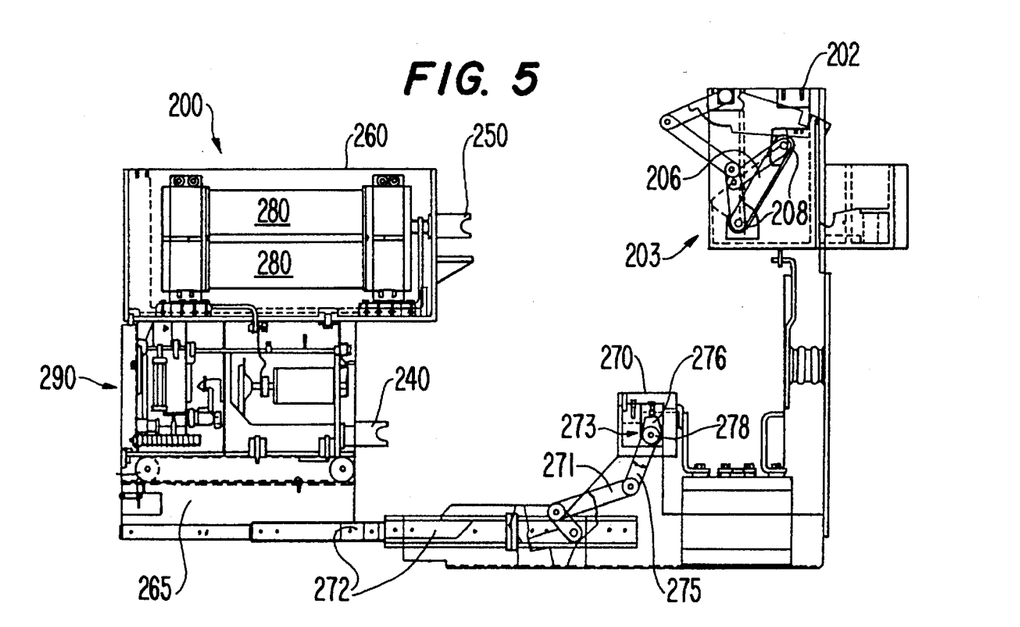
FIG. 5 is a side view of the motor controller of FIG. 2 with its drawout unit in the withdrawn position, its isolation switch open, and its load receptacle open.
Figure 6:
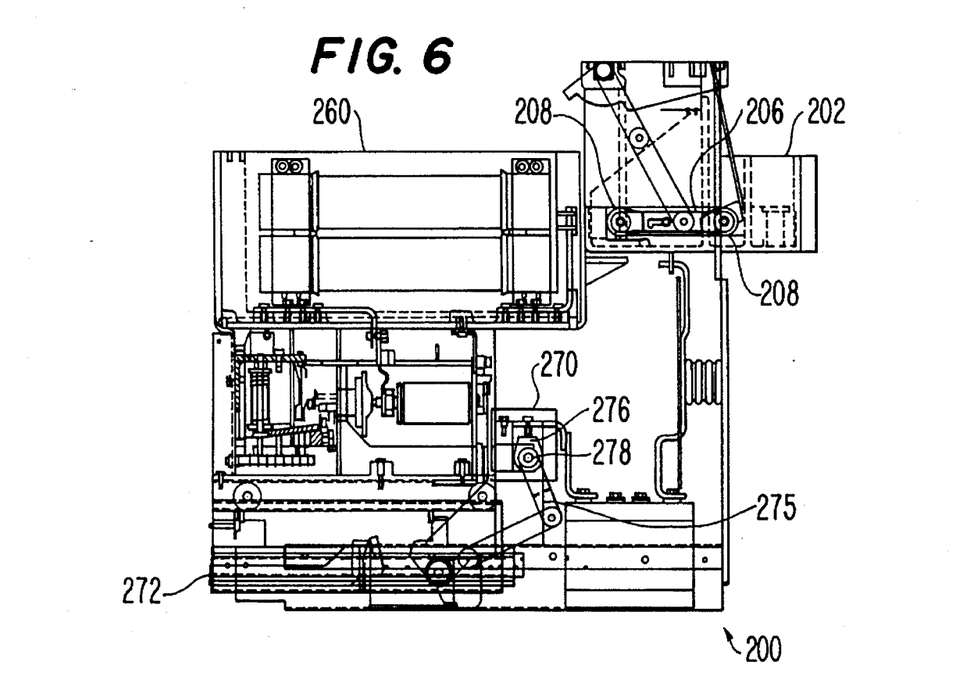
FIG. 6 is a side view of the motor controller of FIG. 2 with its drawout unit inserted, its isolation switch closed, and its load receptacle closed.
Figure 7:
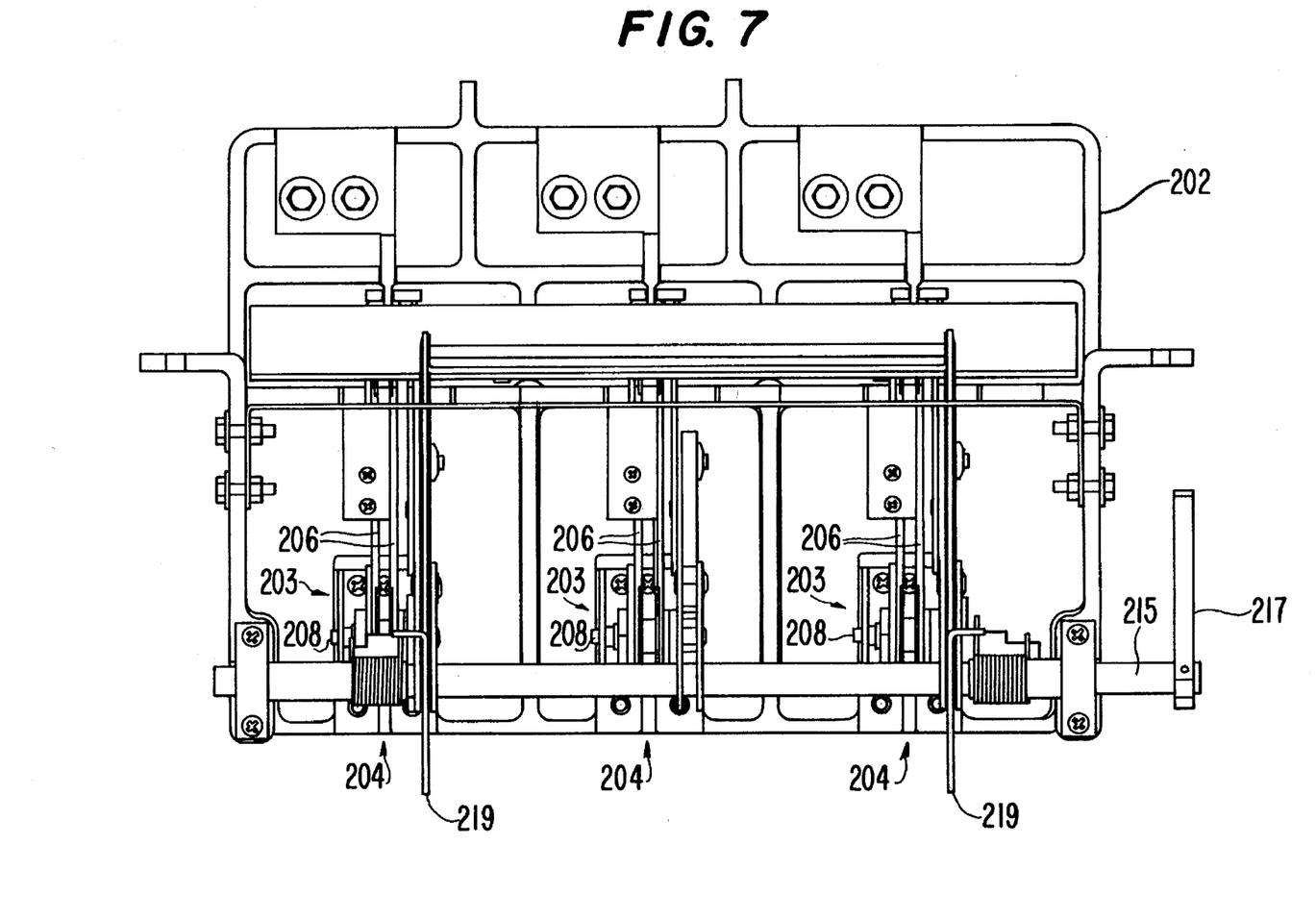
FIG. 7 is an enlarged top view of the isolation switch showing a first set of bolted pressure contacts.
Figure 8:
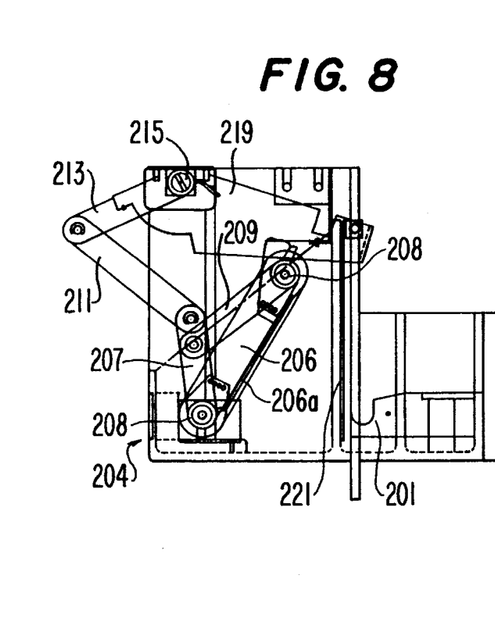
FIGS. 8, 9, and 10 are enlarged side views of the isolation switch, FIG. 8 showing the isolation switch open, FIG. 10 showing the isolation switch completely closed, and FIG. 9 showing the isolation switch in an intermediate position.
Figure 9:
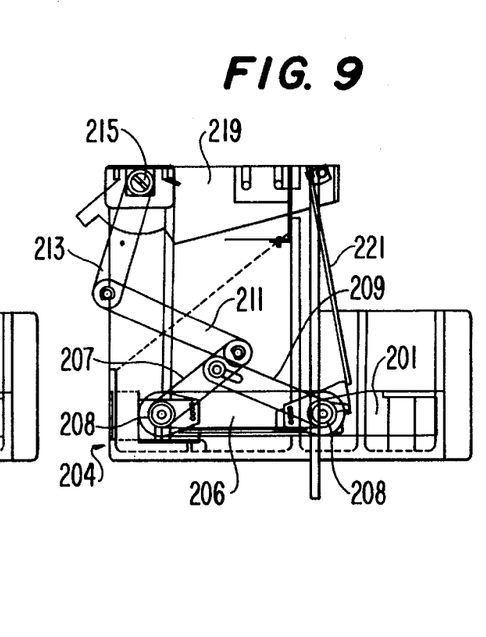
Figure 10:
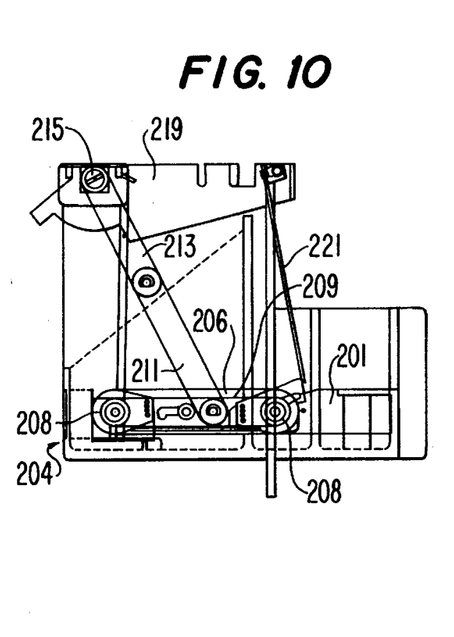
Figure 11:
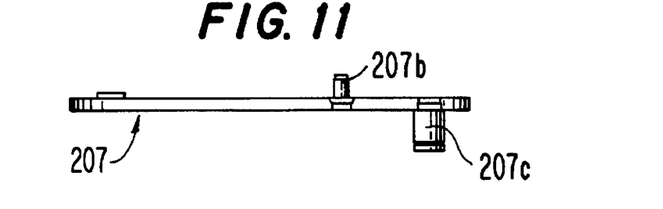
FIG. 11 is an enlarged top view of an isolation switch arm.
Figure 12:
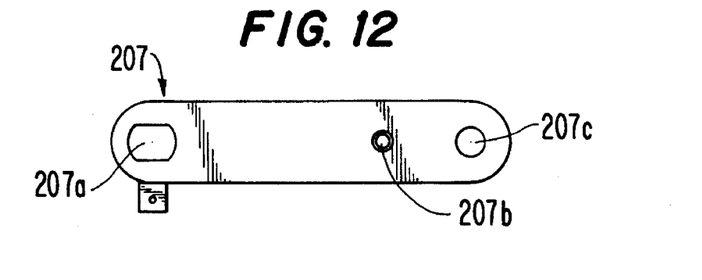
FIG. 12 is an enlarged side view of an isolation switch arm.
Figure 13:
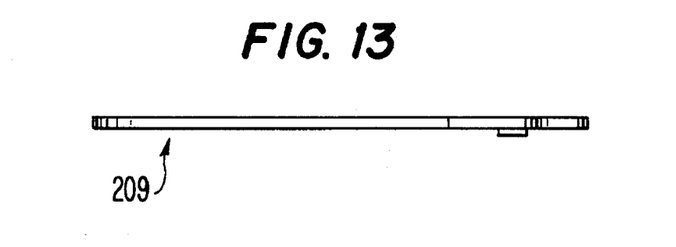
FIG. 13 is an enlarged top view of another isolation switch arm.
Figure 14:
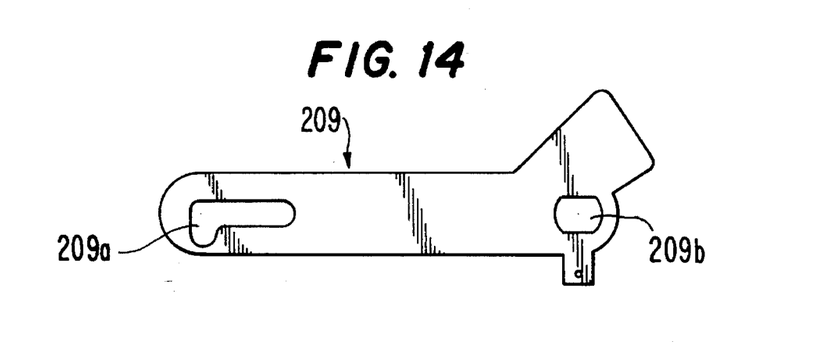
FIG. 14 is an enlarged side view of the isolation switch arm of FIG. 13.

FIG. 4A illustrates a top view of drawout unit 260 in its withdrawn position and FIG. 4B illustrates a top view of isolation switch 202 when the isolation switch is open. FIG. 5 illustrates a side view of motor controller 200 with its drawout unit 260 in the withdrawn position, its isolation switch open, and its load receptacle open. FIG. 6 illustrates a side view of motor controller 200 with the drawout unit inserted, the isolation switch closed, and the load receptacle closed. FIG. 7 is an enlarged top view of the isolation switch and FIGS. 8, 9, and 10 are enlarged side views of the isolation switch.

Motor controller 200 provides a technique for disconnecting and connecting the power connections to the drawout unit which does not use springs or stabs. As illustrated in FIGS. 4 and 5, moveable line terminals 250 and load terminals 240 are provided on the drawout unit 260. Isolation switch 202, including the first set of bolted pressure contacts 203, and load receptacle 270, including the second set of bolted pressure contacts 273, are located on the stationary part of the motor controller.

When the drawout unit 260 is inserted into the motor controller compartment, the line terminals 250 engage the first set of bolted pressure contacts 203 in isolation switch 202, which supplies power to the drawout unit 260. The load terminals 240 engage the second set of bolted pressure contacts in load receptacle 270, which in turn feeds power to the load. As will be described in further detail below, the moveable line terminals and the moveable load terminals form part of the electrical switches between the drawout unit and the stationary portion of the controller. The first set of bolted pressure contacts 203 and the second set of bolted pressure contacts 273 each incorporate a pair of conductors for each phase which clamp onto the line terminals 250 and the load terminals 240, respectively, of drawout unit 260.

FIGS. 7 to 14 illustrate the design of the first set of bolted pressure contacts 203 in more detail. Each of the three (one for each phase) bolted pressure contacts is made up of a pair of switch blades 206 having a clamping bolt 208 at each end. The bolted pressure contacts 203 are designed such that when the drawout unit 260 is inserted, line terminals 250 move through slots 204 in the front of isolation switch 202 and become positioned between a pair of switch blades 206.

The switch blades 206 are connected to an arrangement of arms 207, 209, 211, and 213, which are in turn connected to an operating arm 217 (shown in FIG. 7) via a shaft 215. Operating arm 217 is connected to an isolation switch operating handle (to be described in further detail below with reference to FIG. 19). Arms 207, 209, 211, 213 and 217 and shaft 215 are arranged so that as the isolation switch operating handle is moved to the closed position, arm 217 rotates shaft 215, causing blades 206 to move clockwise (in FIG. 9) to contact the main power supply terminals 201 and thus close the isolation switch. As the shaft 215 continues to rotate, arm 207 moves clockwise (in FIG. 9) to tighten one of bolts 208 (the left bolt in FIG. 9), which has a right-hand thread, and arm 209 moves counter-clockwise (in FIG. 9) to tighten the other bolt 208 (the right bolt in FIG. 9), which has a left-hand thread. Springs 206a bias the isolation switch in the open position, shown in FIG. 8. The design of the arms 207 and 209 are illustrated in FIGS. 11 to 14. Arm 207 includes a hole 207a for a bolt 208 (the left bolt 208 in FIG. 9) and two stubs 207b and 207c. Arm 209 includes a hole 209b for a bolt 208 (the right bolt 208 in FIG. 9) and a hole 209a for mating with stub 207b of arm 207. Stub 207c mates with arm 211.

Two arms 219 are also rigidly connected to the shaft 215. A shutter 221 is pivotally connected to the arms 219 at the ends of the arms away from the shaft. The shutter 221 is made of an electrical insulator. As illustrated in FIG. 8, when the isolation switch 202 is open, the shutter 221 hangs down between the main power supply terminals 201 and switch blades 206, bolts 208, and arms 207, 209, 211, and 213 to provide a physical barrier between the main power supply terminals 201 and switch blades 206, bolts 208, and arms 207, 209, 211, and 213.

Figure 15:
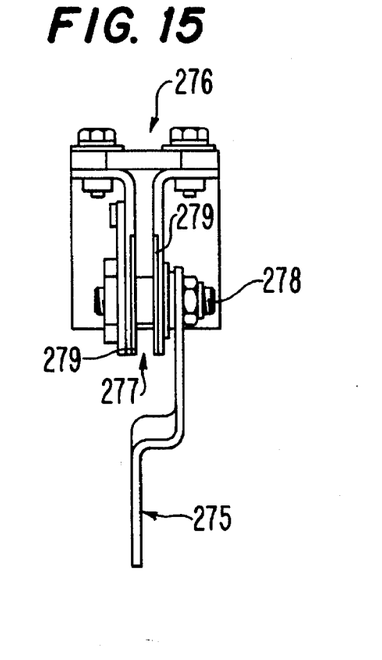
FIG. 15 is an enlarged top view of one of a second set of bolted pressure contacts.

The design of moveable load terminals 240 and load receptacle 270 is similar and will be described with reference to FIGS. 5 and 15. FIG. 15 is an enlarged top view of one of the second set of bolted pressure contacts.

Load receptacle 270 is provided with three current-carrying clamps, or bolted pressure contacts, 276. As illustrated in FIG. 15, contact 276 has a pair of clips 279 which forms a slot 277. A bolt 278 runs through the clips 279. The bolt 278 is connected to an arm 275 so that when the arm is rotated counter-clockwise (in FIG. 5), the bolt 278 tightens, and the clips 279 move closer to one another to clamp onto a load terminal.

Arm 275 is in turn connected via an arm 271 to a load receptacle operating handle 272. Handle 272 is located in the motor controller compartment inside of the motor controller door (not shown) and mechanically locks in the pushed-in (load receptacle closed) position.

The procedure for inserting the drawout unit will now be described. Before the drawout unit 260 can be inserted, switch blades 206 and clips 279 are placed in their spread-apart positions using the isolation switch operating handle and the load receptacle operating handle, respectively, to loosen bolts 208 and 278, thus allowing the drawout unit to be inserted with minimal effort. Mechanical interlocking, to be described below, ensures that these conditions exist. The drawout unit 260 is then inserted.

During insertion of the drawout unit 260, the load terminals 240 move through the slots 277 in the front of load receptacle 270. Handle 272 is then pushed in by the operator, which causes arm 271 to rotate arm 275 counter-clockwise (in FIG. 5) to tighten bolts 278, which causes clips 279 to come together and grip load terminals 240.

In the isolation switch 202, the bolts 208 are still loose at this time and the switch blades in each pair of switch blades are separated from each other, and the drawout unit 260 is still isolated from the power source, as illustrated in FIG. 8. Moving the isolation switch operating handle to the closed position causes the following events to occur in succession in isolation switch 202:

1. As illustrated in FIG. 9, arms 219 move counterclockwise to lift up shutter 221. Arms 209 push the shutter 221 away from the main power supply terminals 201 and the switch blades 206 move clockwise to contact main power supply terminals 201 and thus close the isolation switch. In this position, power is supplied from main power supply terminals 201 to blades 206 and bolts 208. However, the bolts 208 are still loose.

2. As shown in FIGS. 9 and 10, as the isolation switch operating handle is moved to its fully closed position, arm 207 moves clockwise (in FIG. 9) and arm 209 moves counter-clockwise (in FIG. 9) and the arms fold down, thus tightening bolts 208 and applying contact pressure to main power supply terminals 201 and to line terminals 250. In this fully closed position, the switch blades 206 are locked closed and the main power supply terminals 201 and the line terminals 250 of the drawout unit 260 are securely clamped.

FIG. 6 shows the motor controller 200 with the drawout unit 260 inserted, the isolation switch 202 closed, and the load receptacle 270 closed.

Motor controller 200 has the following interlocks for personnel safety and to prevent equipment damage:

1. A mechanical interlock prevents closing the isolation switch 202 unless the door to the motor controller is closed.

2. A mechanical interlock prevents opening the door if the isolation switch is closed.

3. The load receptacle operating handle 272 must be pushed in before the motor controller door can be closed.

4. An electro-mechanical interlock ensures that the vacuum interrupters are open before the isolation switch is opened or closed.

5. A mechanical interlock ensures that the drawout unit cannot be inserted into the connected position if the isolation switch is forced closed (contrary to proper operation) while the door is open.

The combination of interlocks 1 and 3 prevents closing isolation switch 202 unless bolts 278 have been tightened. In addition, the motor controller also includes windows (not shown) through which blades 206 can be viewed to visibly confirm that the isolation switch is open and that the blades are grounded prior to maintenance.

This method of disconnecting and connecting the drawout unit 260 provides several significant advantages over conventional methods employing spring-loaded stabs. First, the contact pressure between switch blades 206 and line terminals 250 and between clips 279 and load terminals 240 is not dependent on a spring. Elimination of the stabs provides superior performance under heavy load, high temperature, and dirty environmental conditions. In addition, a motor controller designed in accordance with this invention generates less heat due to the high contact pressure achieved in the bolted pressure contacts. Over long periods of time and with exposure to elevated temperatures, high loads and dirt, springs can lose their tension, resulting in a loss of contact pressure and possibly in premature failure of the electrical connector. In addition, periodic checking for possibly weakened springs, which is a recommended maintenance procedure, is not required with this improved design.

Another important aspect of the design of motor controller 200 relates to its compact arrangement. As illustrated in the figures, contactor 290 is mounted horizontally under the power fuses 280 and is as far forward as possible. The load receptacle 270 is also moved forward, thus providing space behind the load receptacle 270.

With this arrangement, space is provided under the isolation switch 202 and behind the drawout unit 260 and the load receptacle 270 to locate the current transformers 210 and the terminals 225 for the outgoing field wiring 220. This arrangement also permits a direct connection between the load receptacle 270 and the current transformers 210 using a solid piece of metal in the form of bus links 235, instead of using cables.

By locating the current transformers 210 and terminals 225 for the outgoing wiring behind the drawout unit 260, six inches of width previously required in conventional designs is eliminated, reducing the overall width of the controller from 36 inches to 30 inches. This improved design thus results in an enclosure width 6 inches less than the narrowest enclosure available in the industry, using components of a conventional size. Because medium voltage controllers are normally installed side by side in line-ups consisting of several to many enclosures, the resulting savings in floor space are considerable. Moreover, the elimination of internal power cables that are conventionally used to connect the contactor to current transformers provides enhanced reliability, reduces manufacturing costs, reduces power losses, and provides extra space for field wiring termination.

Figure 16:
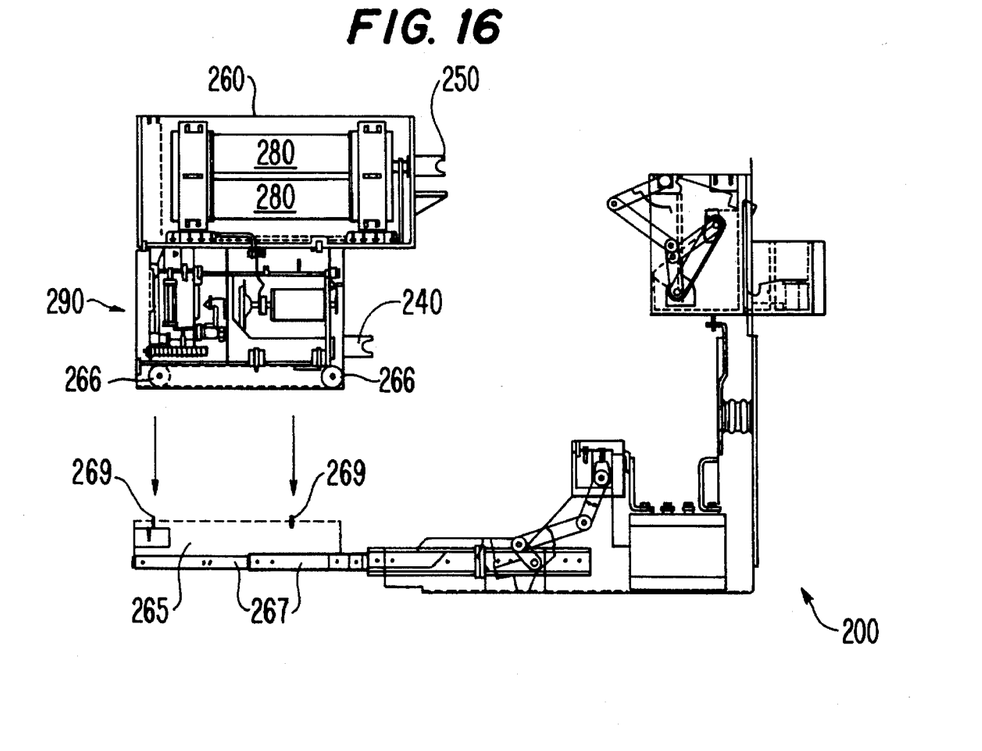
FIG. 16 is a side view of the motor controller of FIG. 5 with its drawout unit displaced upward for clarity.

FIGS. 5 and 16 illustrate other important improvements in motor controller 200 relating to the removal of the drawout unit 260. These figures illustrate a side view of motor controller 200 with the drawout unit 260 withdrawn. In FIG. 16 the drawout unit is displaced upward for clarity.

Drawout unit 260, (including contactor 290, power fuses 280, and other components) rests on a drawer 265 when the drawout unit is both inserted and withdrawn. The drawer 265 is attached to the motor controller housing by a pair of sliding rails 267. (From the vantage point of FIGS. 5 and 16, the second set of the pair of sliding rails is directly behind the first set and is thus obscured.) Four guide pins 269 are provided on top of the drawer 265 on which the drawout unit 260 sits. The pins 269 serve to position the drawout unit 260 accurately on drawer 265. Wheels 266 are provided for wheeling the drawout unit when the drawout unit is removed completely out of the drawer 265.

The sliding rails 267 must be capable of supporting the drawout unit from the stationary portion of the motor controller when the drawout unit is in the withdrawn, or cantilevered, position and must also provide for the precise alignment of the drawout unit with the stationary portion of the motor controller when the drawout unit is being inserted.

Figure 17:
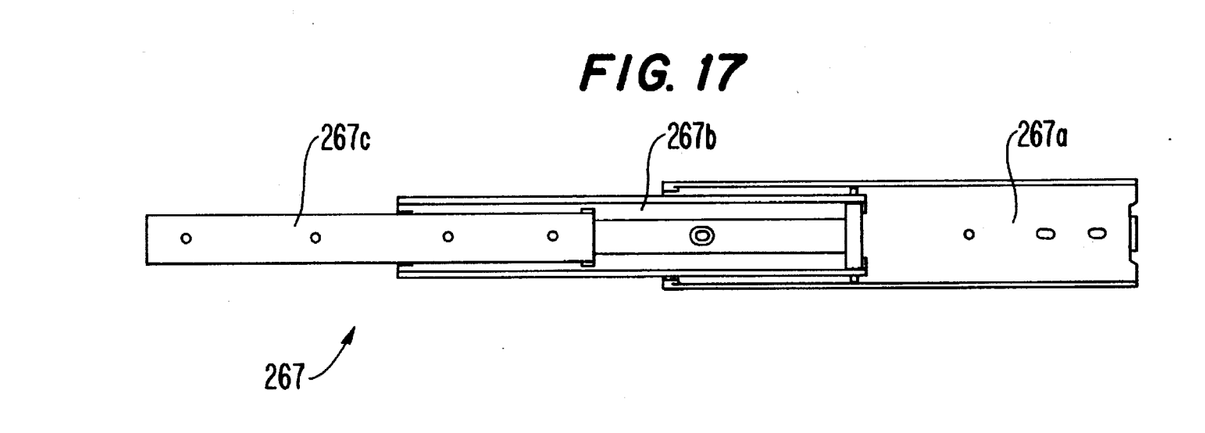
FIG. 17 is an enlarged side view of a sliding rail.
Figure 18:
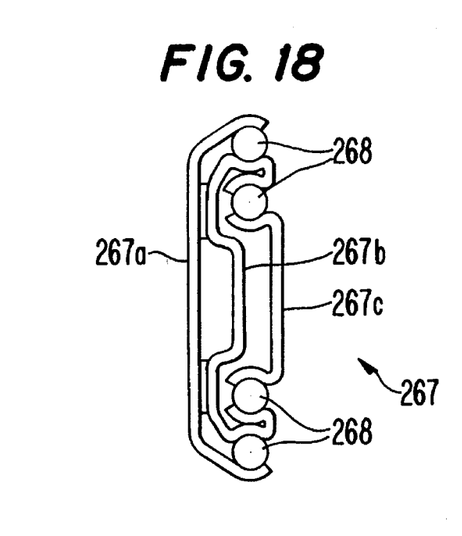
FIG. 18 is an enlarged end view of a sliding rail.

A number of suitable designs exist for sliding rails 267. FIGS. 17 and 18 are enlarged side and end views of one suitable design for the sliding rails. This design is a four-race precision ball bearing slide manufactured by Jonathan Manufacturing Corporation (Fullerton, Calif.). The slide is approximately 33 inches long, 2 inches high, and ½ inch wide and consists of three elongated sections 267a, 267b, and 267c. Section 267a is attached to the stationary portion of the motor controller and section 267c is attached to drawer 265. Ball bearings 268 in four races formed by adjacent sections facilitate movement of the sections with respect to one another.

When the drawout unit 260 is inserted, accurate movement of the drawer 265 along sliding rails 267 results in proper mating of the line and load terminals 250 and 240 with the first and second sets of bolted pressure contacts 203 and 273, respectively, and results in proper operation of the interlocks.

This technique of supporting and guiding the drawout unit provides significant advantages over the conventional method of employing wheels rolling along a guide track. The accurate movement of the sliding rails provides precise alignment between the drawout unit and the fixed mating components. In addition, the drawer serves as a service platform for controllers mounted in the upper compartments of two and three-high arrangements. In contrast, conventional drawout units require a separate temporary service platform in these applications.

Figure 19:
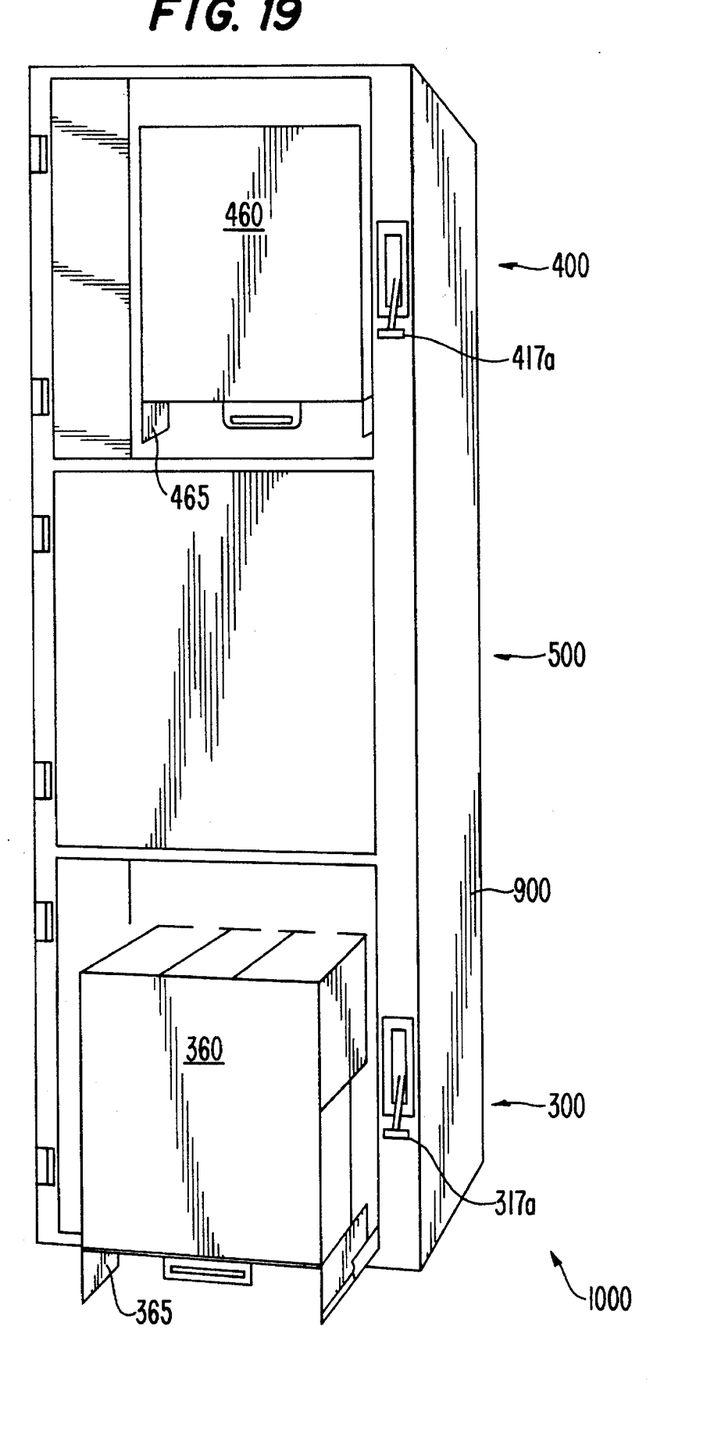
FIG. 19 is an overall view of a two-high motor controller arrangement.

FIG. 19 is an overall view of a two-high motor controller arrangement 1000 constructed in accordance with this invention, with the doors and other components omitted for clarity. Motor controller arrangement 1000 includes two motor controllers in a common housing 900. In FIG. 19, the drawout unit 360 of the lower motor controller 300 is shown in the withdrawn position, supported by drawer 365, and the drawout unit 460 of the upper motor controller 400 is shown in the inserted position, supported by drawer 465. A middle compartment 500 is used to house low voltage components, for example, protection relays. FIG. 19 also illustrates isolation switch operating handles 317a and 417a.

Although the invention has been described above with reference to certain specific implementations of the invention, the invention is not limited to the specific implementations described above. Numerous variations of the invention will occur to those skilled in the field of motor controller design after receiving the above teachings. Therefore, the scope of the invention is defined by reference to the following claims.

What is claimed is:

1. A motor controller comprising:

(a) an isolation switch having a main power supply terminal and a bolted pressure contact; and (b) a drawout unit including a line terminal for engaging the bolted pressure contact when the drawout unit is in an inserted position.

2. A motor controller as set forth in claim 1 wherein the isolation switch further includes:

an arrangement of arms which is connected to an operating handle such that when the operating handle is moved to a closed position one arm moves clockwise to tighten a clamping bolt and another arm moves counter-clockwise to tighten another clamping bolt to apply contact pressure to the line terminal.

3. A motor controller comprising:

(a) a load receptacle having a bolted pressure contact; and (b) a drawout unit including a load terminal for engaging the bolted pressure contact when the drawout unit is in an inserted position.

4. A motor controller comprising:

(a) an isolation switch having a main power supply terminal and a first bolted pressure contact;

(b) a load receptacle having a second bolted pressure contact; and (c) a drawout unit including a line terminal and a load terminal, the line terminal for engaging the first bolted pressure contact when the drawout unit is in an inserted position and the load terminal for engaging the second bolted pressure contact when the drawout unit is in the inserted position.

5. A motor controller as set forth in claim 4 wherein the drawout unit includes a medium voltage contactor.

6. A motor controller as set forth in claim 4 wherein the first bolted pressure contact includes a pair of conductors which clamp onto the line terminal.

7. A motor controller as set forth in claim 4 wherein the first bolted pressure contact includes:

a pair of switch blades arranged parallel to one another and having a clamping bolt at each end such that when the drawout unit is inserted the line terminal moves between the pair of switch blades.

8. A motor controller as set forth in claim 4 wherein the second bolted pressure contact includes a pair of conductors which clamps onto the load terminal.

9. A motor controller as set forth in claim 7 further including a handle to cause the switch blades to rotate together to contact the main power supply terminal and thus close the isolation switch.

10. A motor controller as set forth in claim 8 wherein the pair of conductors forms a slot and wherein a bolt runs through the conductors and is connected to an arm such that when the arm is rotated the bolt tightens and the conductors move closer to one another to grip the load terminal.

11. A medium voltage motor controller comprising:

(a) an isolation switch;

(b) a load receptacle;

(c) a drawout unit; and (d) a current transformer to generate a sensing signal, the current transformer being located below the isolation switch and behind the drawout unit and the load receptacle.

12. A medium voltage motor controller as set forth in claim 11 further including a solid bar which electrically connects the load receptacle and the current transformer.

13. A medium voltage motor controller as set forth in claim 11 wherein the medium voltage motor controller is approximately thirty inches wide.

14. A medium voltage motor controller as set forth in claim 11 wherein the medium voltage motor controller is less than thirty three inches wide.

15. A motor controller arrangement comprising:

(a) a housing;

(b) a first motor controller within the housing, the first motor controller having a first drawout unit and a first drawer on which the first drawout unit rests when the first drawout unit is both inserted and withdrawn; and (c) a second motor controller within the housing, the second motor controller having a second drawout unit and a second drawer on which the second drawout unit rests when the second drawout unit is both inserted and withdrawn.

16. A motor controller arrangement as set forth in claim 15 further comprising:

at least one sliding rail supporting the first drawer.

17. A motor controller arrangement as set forth in claim 15 wherein at least one of the first drawout unit and the second drawout unit includes a medium voltage contactor.

18. A medium voltage motor controller comprising:

(a) an isolation switch having a main power supply terminal and a first bolted pressure contact;

(b) a load receptacle having a second bolted pressure contact;

(c) a drawout unit including a line terminal and a load terminal, the line terminal for engaging the first bolted pressure contact when the drawout unit is in an inserted position and the load terminal for engaging the second bolted pressure contact when the drawout unit is in the inserted position;

(d) a current transformer to generate a sensing signal;

(e) a terminal for attaching an outgoing power line;

(f) a drawer on which the drawout unit rests; and (g) a pair of sliding rails supporting the drawer.

19. A medium voltage motor controller as set forth in claim 18 wherein the drawout unit includes a power fuse and a medium voltage vacuum contactor.

20. A medium voltage motor controller as set forth in claim 18 wherein the first bolted pressure contact includes a pair of conductors which clamps onto the line terminal.

21. A medium voltage motor controller as set forth in claim 18 wherein the first bolted pressure contact includes:

a pair of switch blades arranged parallel to one another and having a clamping bolt at each end such that when the drawout unit is inserted the line terminal moves between the pair of switch blades.

22. A medium voltage motor controller as set forth in claim 18 wherein the second bolted pressure contact includes a pair of conductors which clamps onto the load terminal.

23. A medium voltage motor controller as set forth in claim 18 wherein the current transformer is located below the isolation switch and behind the drawout unit and the load receptacle.

24. A medium voltage motor controller as set forth in claim 18 further including a solid bar which electrically connects the load receptacle and the current transformer.

25. A medium voltage motor controller as set forth in claim 19 wherein the contactor is mounted horizontally under the power fuse.

26. A medium voltage motor controller as set forth in claim 21 wherein the isolation switch further includes:

an arrangement of arms which is connected to an operating handle such that when the operating handle is moved to a closed position one arm moves clockwise to tighten one clamping bolt and another arm moves counter-clockwise to tighten another clamping bolt to apply contact pressure to the line terminal.

27. A medium voltage motor controller as set forth in claim 21 further including a handle to cause the switch blades to rotate together to contact the main power supply terminal and thus close the isolation switch.

28. A medium voltage motor controller as set forth in claim 22 wherein the pair of conductors forms a slot and wherein a bolt runs through the conductors and is connected to an arm such that when the arm is rotated the bolt tightens and the conductors move closer to one another to grip the load terminal.

29. A medium voltage motor controller as set forth in claim 23 wherein the medium voltage motor controller is approximately thirty inches wide.

30. A medium voltage motor controller as set forth in claim 23 wherein the medium voltage motor controller is less than thirty three inches wide.

* * * * *